US006684332B1

(12) United States Patent
Douglas (10) Patent No.: US 6,684,332 B1
(45) Date of Patent: *Jan. 27, 2004

(54) METHOD AND SYSTEM FOR THE EXCHANGE OF DIGITALLY SIGNED OBJECTS OVER AN INSECURE NETWORK

(75) Inventor: Daniel Graham Douglas, San Jose, CA (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/095,453

(22) Filed: Jun. 10, 1998

(51) Int. Cl.[7] .............................................. B05H 36/01
(52) U.S. Cl. ....................... 713/168; 713/169; 713/201; 713/161
(58) Field of Search ......................... 380/257; 713/168, 713/161, 169, 201

(56) References Cited

U.S. PATENT DOCUMENTS

| 5,005,200 | A |   | 4/1991  | Fischer         | 380/30   |
| 5,164,988 | A |   | 11/1992 | Matyas et al.   | 380/25   |
| 5,200,999 | A |   | 4/1993  | Matyas et al.   | 380/25   |
| 5,537,475 | A |   | 7/1996  | Micali          | 380/30   |
| 5,539,828 | A |   | 7/1996  | Davis           | 380/50   |
| 5,602,918 | A |   | 2/1997  | Chen et al.     | 380/21   |
| 5,604,804 | A |   | 2/1997  | Micali          | 280/25   |
| 5,615,268 | A |   | 3/1997  | Bisbee et al.   | 380/25   |
| 5,680,461 | A |   | 10/1997 | McManis         | 380/25   |
| 5,692,047 | A |   | 11/1997 | McManis         | 380/4    |
| 5,694,546 | A |   | 12/1997 | Reisman         | 395/200.9 |
| 5,701,343 | A |   | 12/1997 | Takashima et al.| 380/4    |
| 5,748,960 | A | * | 5/1998  | Fiskcher        | 395/683  |
| 5,757,913 | A | * | 5/1998  | Bellare et al.  | 380/46   |
| 5,956,404 | A | * | 9/1999  | Schneier        | 380/25   |
| 6,047,067 | A | * | 4/2000  | Rosen           | 380/24   |
| 6,148,349 | A | * | 11/2000 | Chow et al.     | 710/33   |

FOREIGN PATENT DOCUMENTS

EP          0778520       6/1997      ............. G06F/9/45

OTHER PUBLICATIONS

Schneier, Applied Cryptography, 2e, 1996.*
Richard Smith, Internet Cryptography, 1997.*
Coulouris et. al. Distributed Systems, Concepts and Design 2e, Addison–Wesley, 1994.*
Shoffner et. al. Java and Web–Executable Object Security, Nov. 1996.*
Grady Booch, Object–Oriented Analysis and Design with Applications 2e, Benjamin, p. 474, 1994.*
Keefe, et. al. Soda: A Secure Object–Oriented Database System, Computers & Security 8, pp. 517–533, 1989.*
Felten, Webware Security, Communication of the AC M, 40(4) pp. 130, Nov. 1996.*
Stevens, TCP/IP Illustrated, vol. 1 Protocols, Addison–Wesley, p. 226, 231–233, 1994.*
IBM Technical Disclosure Bulletin, vol. 39, No. 02, Feb. 1996, Public–Key–Based Certification Infrastructure Framework for Asynchronous Transfer Mode.

* cited by examiner

Primary Examiner—Ayaz Sheikh
Assistant Examiner—James Seal
(74) Attorney, Agent, or Firm—Sawyer Law Group LLP (57) ABSTRACT

Method and system aspects for authenticated communication of messages among computer systems in an insecure network are described. These aspects include building a first signed object message in a first computer system, the first signed object message including a first sequence number, a first object and a first signature. Further included is sending the first signed object message to a second computer system, verifying the first signed object message in the second computer,system, and building a second signed object message in the second computer system for replying to the first computer system when the first signed object message is verified, the second signed object message including a second sequence number, a second object, and a second signature.

15 Claims, 8 Drawing Sheets

| SignedObject |
| --- |
| 🔑 sequenceNumber : long |
| 🔑 obj : Serializable |
| 🔑 sig : byte[] |
| 🔧 sign (context : ObjectSigningContext) : void |
| 🔧 verify (context : ObjectSigningContext) : boolean |

```
public void sign( ObjectSigningContext context ) {
    DerOutputStream seq = new DerOutputStream();
    DerOutputStream list = new DerOutputStream();

this.sequenceNumber = context.outGoingSeqNum++;
    list.putInteger( new BigInt( this.sequenceNumber ) );

ByteArrayOutputStream objBytes = new ByteArrayOutputStream();
    ObjectOutputStream objOut = new ObjectOutputStream( objBytes );
    objOut.writeObject( this.obj );
    objOut.flush();

list.putBitString( objBytes.toByteArray() );
    seq.write( DerValue.tag_SequenceOf, list );

Signature sg=new Signature(context.signer.getPrivate().getAlgorithm());
    sg.initSign( context.signer.getPrivate() );
    sg.update( seq.toByteArray() );
    this.sig = sg.sign();
}
```

FIG. 6

| SignedObject |
|---|
| 🔓 sequenceNumber : long<br>🔓 obj : Serializable<br>🔓 sig : byte[] |
| 🔑 sign (context : ObjectSigningContext) : void<br>🔑 verify (context : ObjectSigningContext) : boolean |

```
public boolean verify ( ObjectSigningContext context ) {
  if (this.sequenceNumber != context.inComingSeqNum) return false;
  context.inComingSeqNum++;
  DerOutputStream seq = new DerOutputStream();
  DerOutputStream list = new DerOutputStream();
  list.putInteger(new BigInt( this.sequenceNumber ));
  ByteArrayOutputStream obBytes = new ByteArrayOutputStream();
  ObjectOutputStream objOut = new ObjectOutputStream( obBytes );
  objOut.writeObject( this.obj );
  objOut.flush();
  list.putBitString( obBytes.toByteArray() );
  seq.write( DerValue.tag_SequenceOf,list );
  Signature sg=new Signature(context.partnerCert.getPublicKey().getAlgorithm());
  sg.initSign( context.partnerCert.getPublicKey() );
  sg.update( seq.toByteArray() );
  return sg.verify(this.sig);
}
```

METHOD AND SYSTEM FOR THE EXCHANGE OF DIGITALLY SIGNED OBJECTS OVER AN INSECURE NETWORK

FIELD OF THE INVENTION

The present invention relates to network communication, and more particularly to authenticated communication across an insecure network.

BACKGROUND OF THE INVENTION

Data communication across computer networks has become a standard in both professional and personal computing environments. With the increase in reliance on computer networks for data communication, increased efforts have arisen to ensure that networks remain secure during data transfers. More particularly, data encryption techniques have been developed and utilized to aid in securing data communication across networks.

Encryption suitably refers to the transformation of plaintext data into an unintelligible form known as ciphertext. Encryption is usually accomplished by the application of mathematical algorithms on the plaintext data. These algorithms are defined by parameters known as 'keys'. Two common encryption methods are symmetric methods which use private keys, and asymmetric methods which use public keys. Both private key encryption (such as DES (Data Encryption Standard)) and public key encryption methods have been implemented, but, key cryptographic methods alone do not allow a recipient to authenticate the validity of the public key nor to validate the identity of the sender.

In general, authentication allows for the verification that someone or something is valid or genuine. Digital signature authentication allows the receiver of a message to be confident of the identity of the sender and/or the integrity of the message. Digital signatures have been used to guarantee the validity of a public key by being incorporated into a digital certificate. The 'signed' document containing the digital signature attests to the validity and public key of the person signing the message, and prevents one user from impersonating another through a phony key pair. Along with the public key and name of the subject, the certificate also contains the validity period of the key, the name of the issuer of the certificate, the certificate serial number, and is digitally signed by the issuer. However, a secure, centralized repository is required for storing and managing the keys. For example, the X.500 directory may be used as a repository for storing certificates, with association of the public keys of network users with their distinguished name. (An X.500 distinguished name refers to a unique object in the X.500 Directory, and is a sequence of vertex points leading from the 'root' of the tree to the object of interest, as is conventionally understood). The X.500 standard defines an authentication framework, known as X.509, for use by OSI (Open Systems International connection) applications to provide a basis for authentication and security services. The X.509 framework describes how authentication information is formed and placed in the directory. The X.509 authentication framework also defines basic security services, including simple and strong authentication. Strong authentication involves the use of public key cryptographic standard (PKCS) and a trusted hierarchy of Certificate Authorities (CAs), where a CA refers to a trusted source for obtaining a user's authentication information or certificate.

While data encryption techniques do provide security for network communications, such security measures are too extreme and costly to implement for some networks. For example, in certain situations, total data security is not as vital as verification that systems performing communication are authentic. A desire remains therefore for authenticated communication across an insecure network. In such situations, the concern is ensuring that the communicating system is genuine in its representation, rather than strict security of data.

Accordingly, what is needed is a method and system for providing an authenticated communication channel in an efficient and effective manner. The present invention addresses such a need.

SUMMARY OF THE INVENTION

The present invention provides method and system aspects for authenticated communication of messages among computer systems in an insecure network. These aspects include building a first signed object message in a first computer system, the first signed object message including a first sequence number, a first object, and a first signature. Further included is sending the first signed object message to a second computer system, verifying the first signed object message in the second computer system, and building a second signed object message in the second computer system for replying to the first computer system when the first signed object message is verified, the second signed object message including a second sequence number, a second object, and a second signature.

Through the present invention, communication among computer systems in an insecure network readily occurs in an authenticated manner. Further, the signed object exchange utilizes available resources in an innovative and straightforward manner, while achieving communication techniques that are resistant to replay attacks and exportable. These and other advantages of the aspects of the present invention will be more fully understood in conjunction with the following detailed description and accompanying drawings.

DETAILED DESCRIPTION OF THE INVENTION

The present invention relates to authenticated communication over an insecure network. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Further, the present invention is described in a preferred embodiment as being implemented in accordance with JAVA object-oriented programming techniques, and more specifically, with resources of the JAVA Development Kit (JDK) 1.1, available from Sun Microsystems, Inc., Mountain View, Calif. However, it should be appreciated that the aspects of the present invention may be achieved in other programming environments that provide substantially equivalent functionality, as is well appreciated by those skilled in the art.

Figure 1:
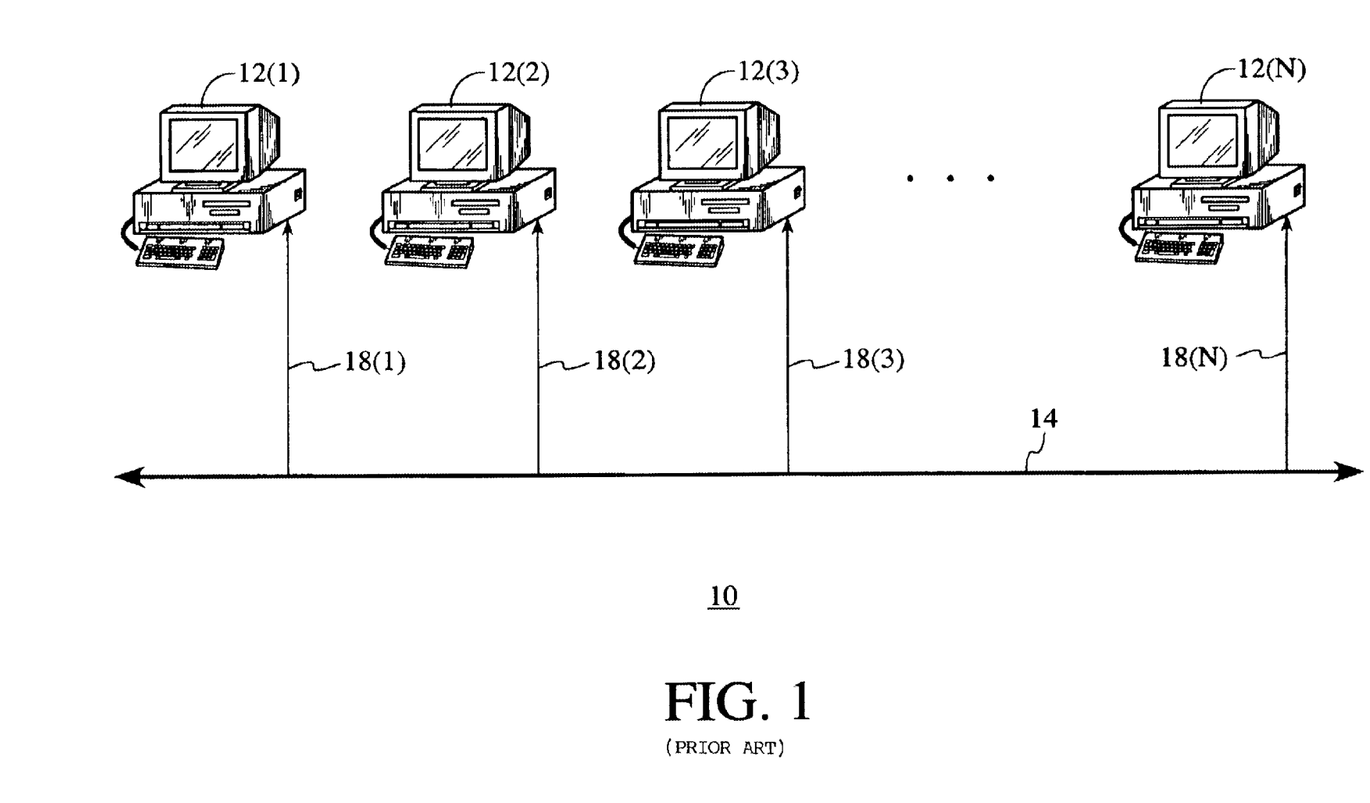
FIG. 1 illustrates a functional block diagram of a computer network in accordance with the present invention.

FIG. 1 illustrates a functional block diagram of a computer network arrangement 10 with authenticated channel operations between JAVA, applications in accordance with the present invention. As shown in FIG. 1, computer network 10 includes a plurality of computers 12(1) through 12(N) (generally referred to herein as 12) interconnected by a communication link 14. At least some of the computers 12 are in the form of personal computers or computer workstations, each of which includes a system unit, a video display unit, and operator input devices, such as a keyboard and mouse, as is conventionally known. The system unit generally includes processing, memory, and mass storage devices, such as disk and/or tape storage elements, and other elements (not separately shown), including network interface devices 18 for interfacing the computers 12 to the communication link 14. A video display unit permits the computer to display processed data and processing status to the user, and an operator input device enables the user to input data and control processing by the computer. The computers 12 transfer information, in the form of messages, through their respective network devices 18 among each other over the communication link 14.

The network 10 is suitably organized in a conventional 'client-server' configuration, in which various ones of the computers 12 act as clients and servers. The communication link 14 interconnecting the clients 12 in the network 10 may, as is conventional, comprise wires, optical fibers, or other suitable media for carrying signals representing information among the computers 12. In addition the computer link 14 may comprise a public telephony system and/or the Internet, over which a person using computer 12 may access information, including programs and data from a 'server' computer which may be located some distance from a 'client' computer, as is well understood by those skilled in the art. Through the present invention, digitally authenticated communication between JAVA applications operating on computers 12 via communication link 14 is achieved.

Figure 2:
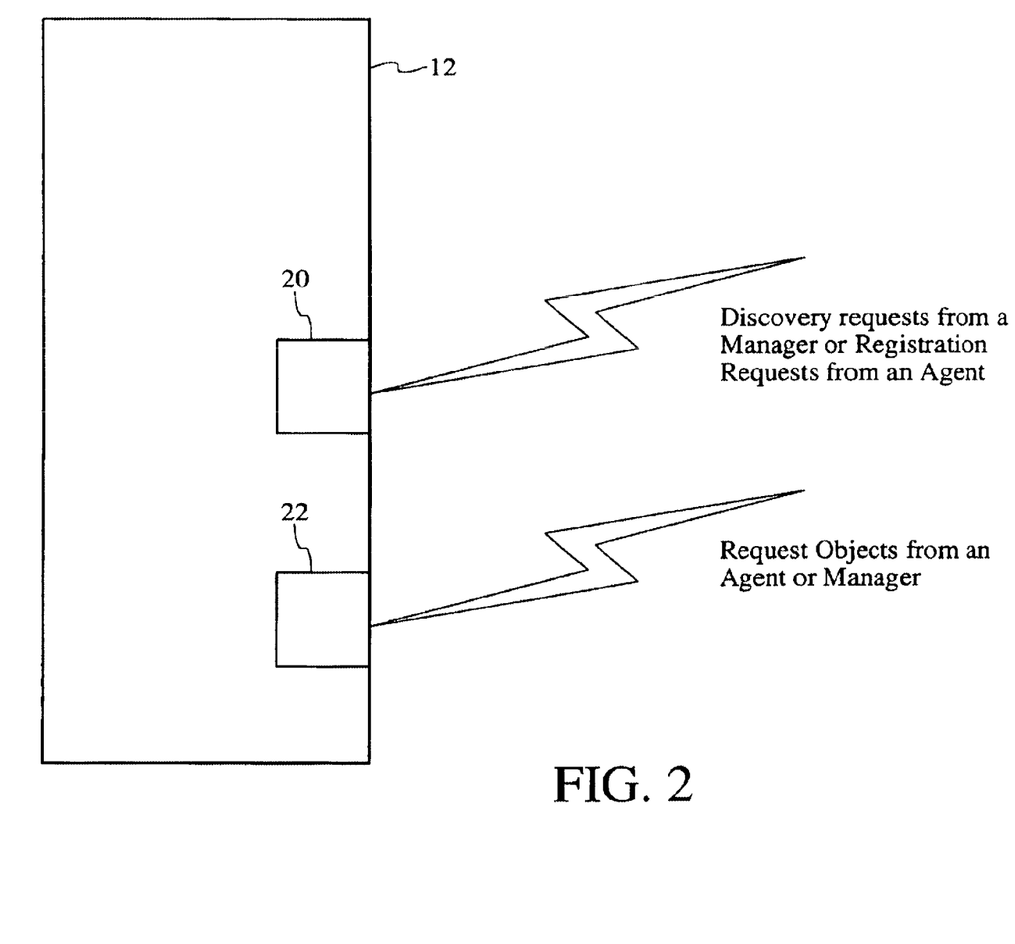
FIG. 2 illustrates a block diagram of a computer in the network of FIG. 1.

In a preferred embodiment, each of the computers 12 includes two ports, a registration/discovery port 20 and an object port 22, as shown in FIG. 2. The registration/discovery port 22 is suitably utilized in identifying network participants, the operation of which is not included in the discussion of the present invention. In a preferred embodiment, communication over the object port 22 utilizes a digitally signed exchange of objects using object serialization and DSA (digital signature algorithm) signatures. Thus, with the object port 22, a customized protocol is provided that advantageously utilizes available resources of JDK 1.1.

In general terms, to clients and servers 12 using the object port 22 for communication, it appears that the computers 12 are reading and writing objects from a socket. At a lower level, the objects are signed on the sending side, and the signature is verified on the receiving side. Certificates are exchanged during the establishment of a socket connection in a handshake that validates the two communicating parties, as described more fully hereinbelow.

Figure 3:
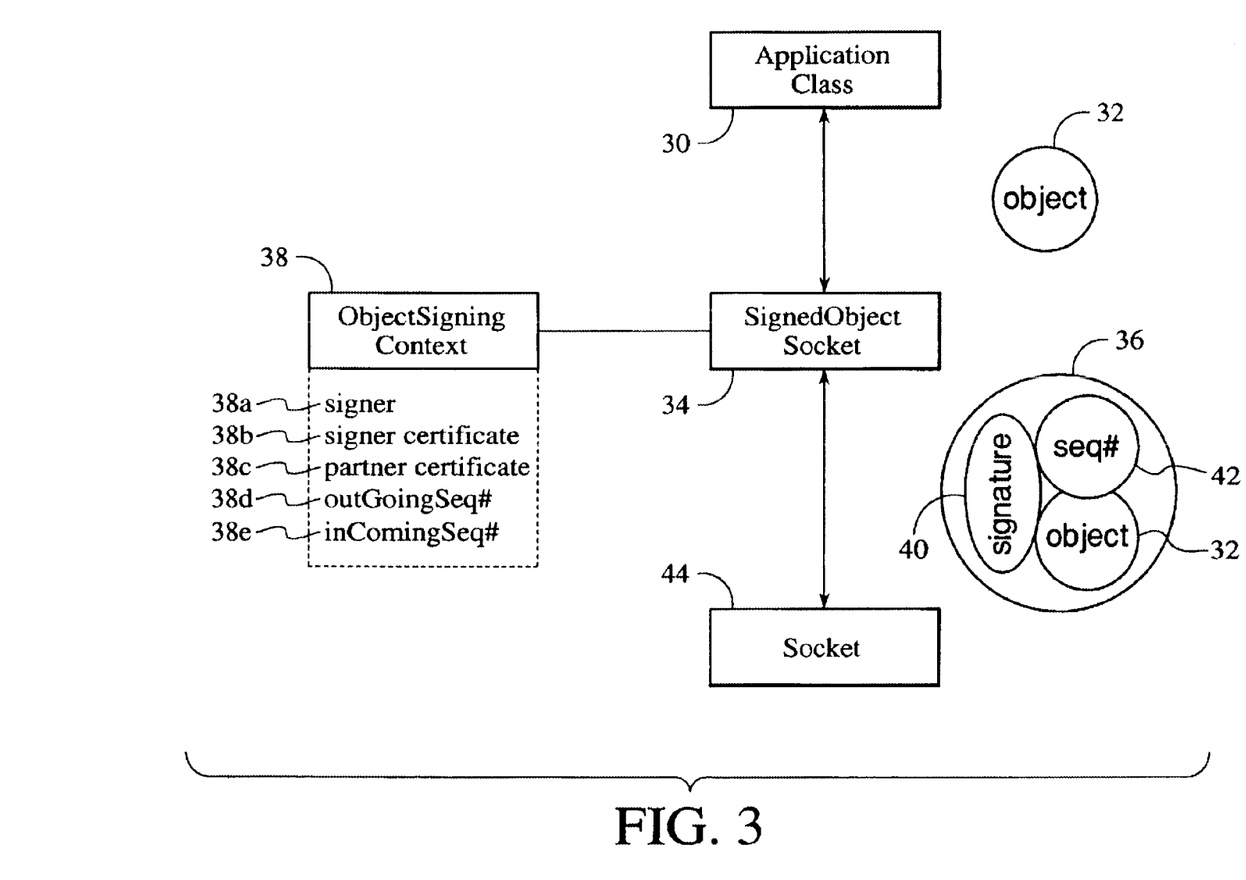
FIG. 3 illustrates a block diagram of a process for formation of a signed object message in accordance with the present invention.

FIG. 3 illustrates a block diagram of a process for formation of a signed object in accordance with the present invention, the process being provided via a suitable computer readable medium, e.g., computer memory, floppy disk, hard disk, etc. For purposes of this discussion, a signed object refers to an object message signed using DSS (digital signature standard) to generate signature bits based on the serialized version of the object and sequence number. Referring to FIG. 3, an application 30 (i.e., a JAVA application) operating on a 'client' 12 (FIG. 1) creates an object 32 for communication. A socket, e.g., a SignedObjectSocket, 34 is provided in accordance with the present invention and formed as a specialized java.net.socket for facilitating the formation of a signed object 36. The signed object 36 is suitably associated with an object context, e.g., an Object-Signing context, 38 in accordance with the message exchange protocol of the present invention. From the object signing context 38, which provides a signer's keys 38a, i.e., a public/private key pair used to sign, a signer's certificate 38b which identifies the signer, a partner certificate 38c identified by the system being communicated with, an outgoing sequence number 38d(outGoingSeq#), and an incoming sequence number 38e (inComingSeq#), the signed object 36 includes a signature 40 and a sequence number (seq#) 42 attached to the original object 32. The signed object 36 is then appropriately communicated over communication link 14 via a server socket 44, e.g., a TCP/IP socket. Thus, the entire SignedObject is sent across a TCP/IP socket using object serialization, constructed on the other end, and then verified.

Figure 4:
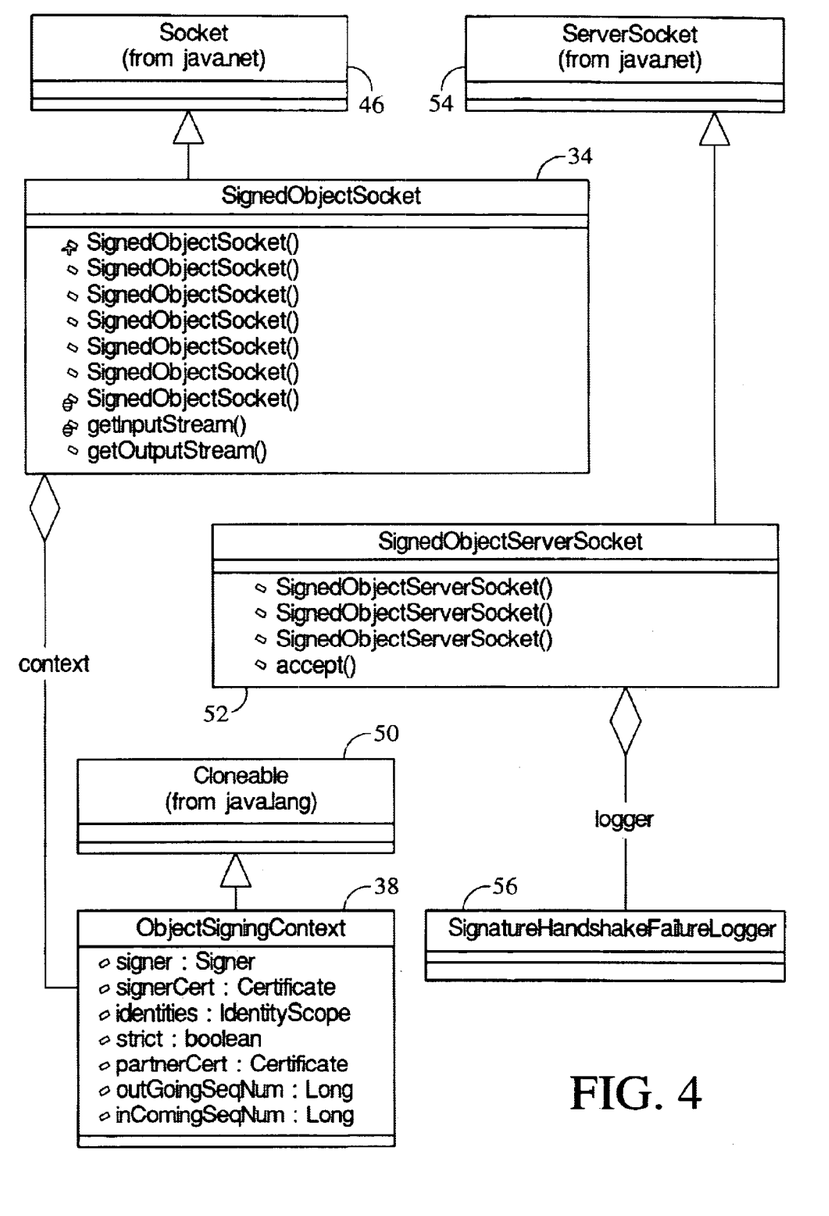
FIG. 4 illustrates an exemplary class hierarchy diagram of a signed object socket.

FIG. 4 illustrates an exemplary class hierarchy diagram for signed object socket 34. As shown, signed object socket 34 is suitably a subclass of the socket class 46 (from java.net). Associated with the signed object socket subclass 34 is the object context, ObjectSigningContext, 38, which is a subclass of a cloneable class 50 (from java.lang). Also included is a signed object server subclass 52 of a server socket class 54 (from java.net). Associated with the signed object server subclass 52 is a logger 56 for logging signature handshake failures, signature handshake failures occurring during a handshake, the handshake being described more fully hereinbelow.

Figure 5:
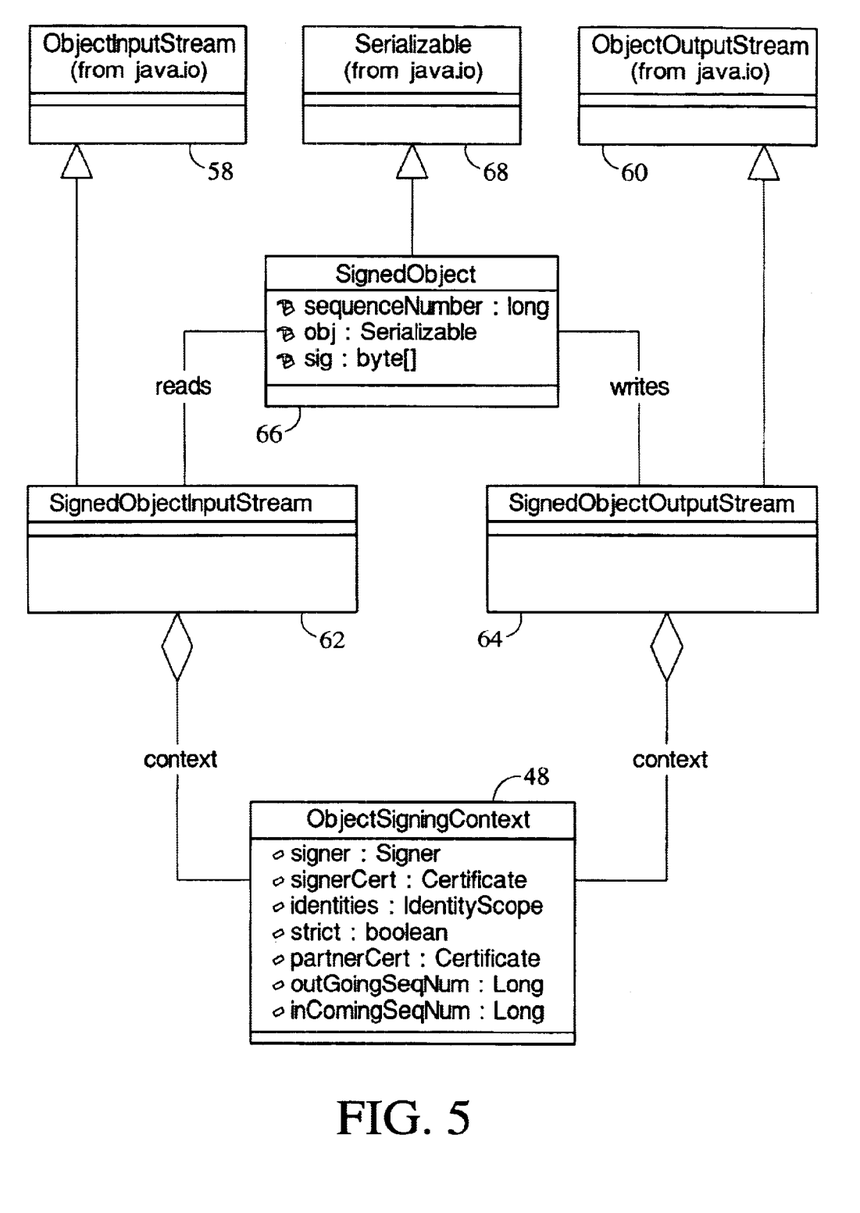
FIG. 5 illustrates an exemplary class hierarchy diagram of the serializable stream of signed object data from a signed object socket.

FIG. 5 illustrates an exemplary class hierarchy diagram for the serializable stream of signed object data from signed object socket 34. When requested, the signed object socket 34 returns an input stream 58 or an output stream 60 (from java.io) depending upon whether the computer 12 is sending or receiving an object message. The input and output stream objects 58 and 60 are of a signed object input stream class 62 and signed object output stream class 64, respectively. The signed object output stream 64 creates a signed object 66 (which is a subclass of a serializable class 68 from java.io) internally composed of the object written, a sequence number, and a signature comprising the serializable object and the sequence number, which is written to the output. The signed object input stream 62 reads a signed object 66, verifies the signature and passes along the inner object to the caller.

Preferably, the signed object is signed using an object signing context (38, FIG. 3).

Figure 6:
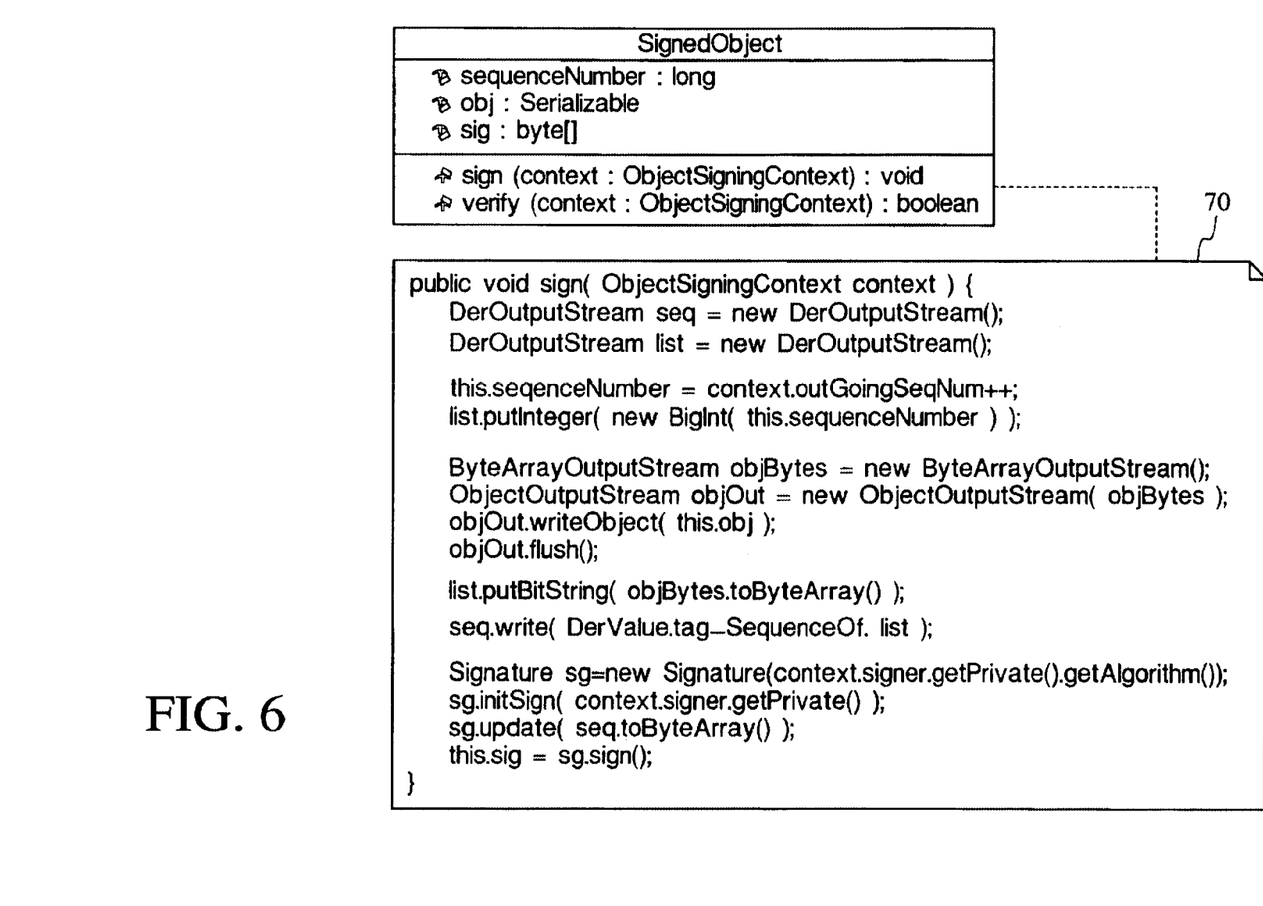
FIG. 6 illustrates an example of suitable signature creation logic.

An example of suitable signature creation logic 70 in accordance with the present invention is presented in FIG. 6. The logic of FIG. 6 represents construction of a DER (distinguished encoding rule) sequence with the outgoing sequence number as a big integer (BigInt) followed by the serializable object. The DER encoded sequence is then signed using the signer object (38a, FIG. 3) in the object context with the signature bits stored in the signed object (36, FIG. 3).

Figure 7:
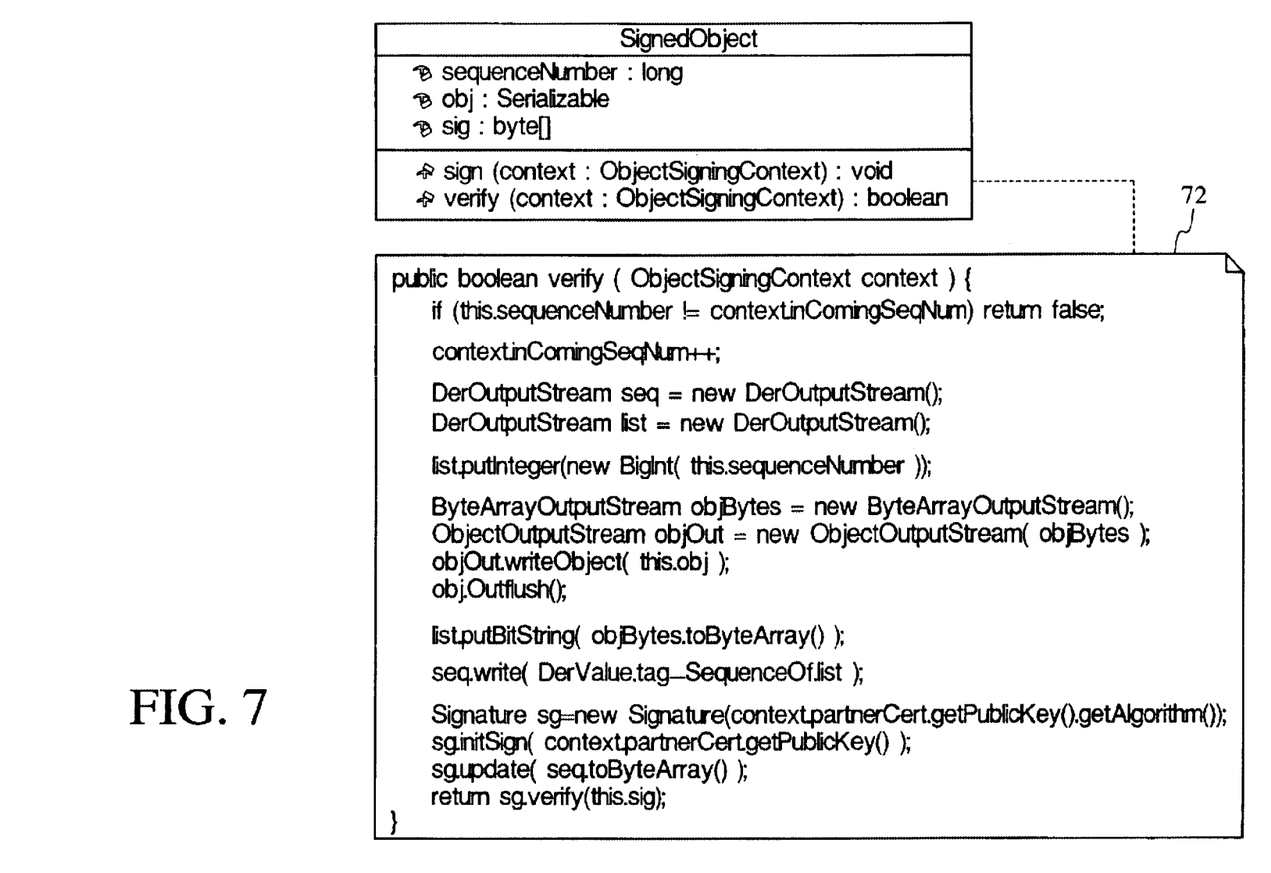
FIG. 7 illustrates an example of suitable signature verification logic.

Upon receiving a signed object, the signature of the signed object requires verification. An example of signature verification logic 72 is presented in the diagram of FIG. 7. Verification occurs by first reconstructing the DER encoded sequence and verifying the signature bits stored in the signed object using the public key from the object signing context on the recipient's side. As described above, the establishment of signature verification through signed objects initiates via a pair of handshake messages.

Figure 8:
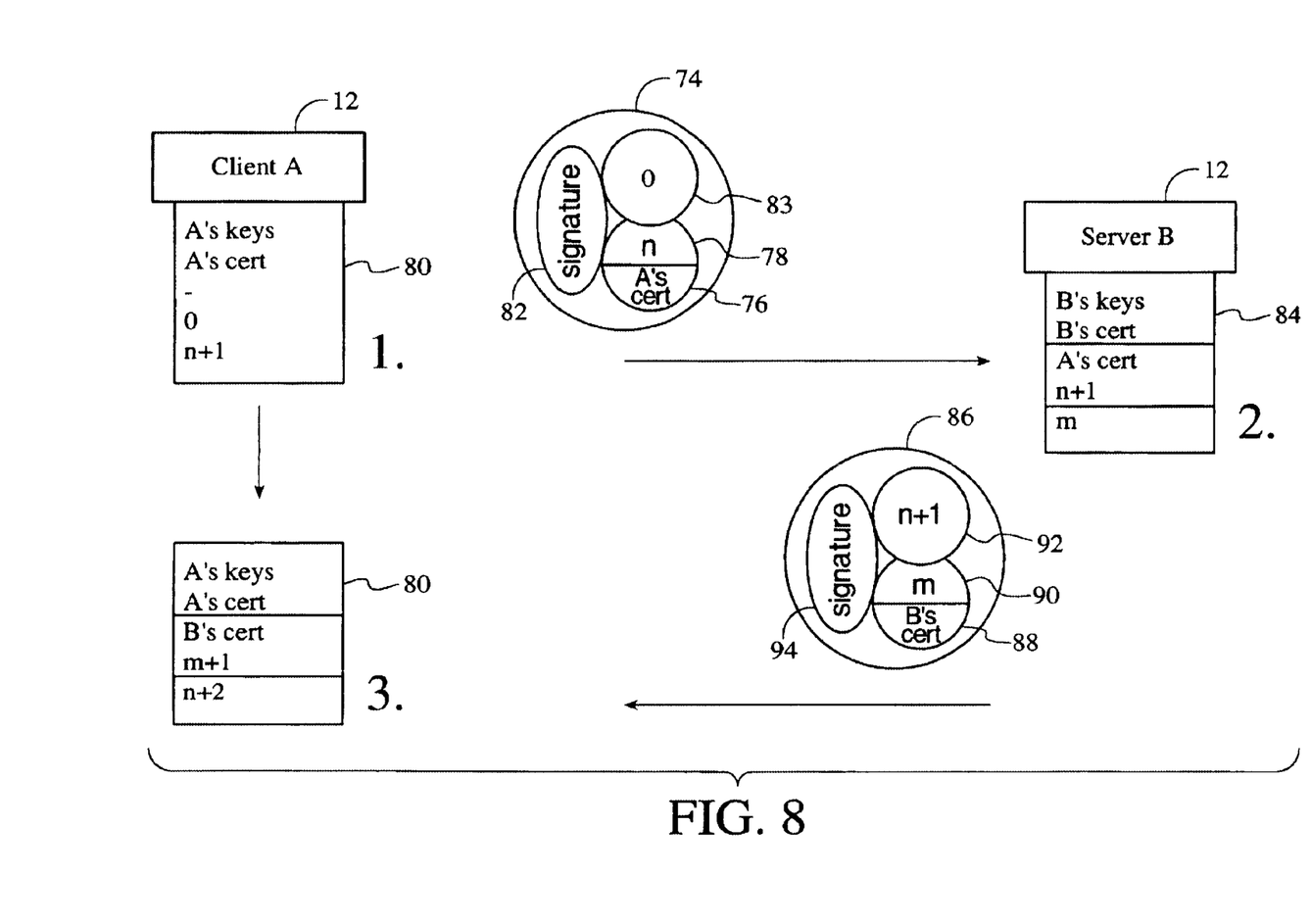
FIG. 8 illustrates a block diagram of a handshake for signed object communication in accordance with the present invention.

FIG. 8 illustrates a diagram of a process for a handshake between two computers 12, one computer acting as client A and a second computer acting as server B. The initial handshake in setting up the signed object communication consists of a pair of messages exchanged between the sender (client A) and the receiver (server B). The messages exchanged serve to authenticate the communication and to prime the object context with the certificate and incoming sequence number. The handshake begins with the communication initiator, i.e., client A, building a signed object handshake message 74, SignedObjectHandshakeMessage, with its certificate 76 and a chosen sequence number 78 in accordance with its object context 80. The chosen sequence number preferably provides a number that prevents replay attacks, such as a random number or the current timestamp represented as a long. The certificate requires previous generation and distribution, such as by the certificate generation method provided in co-pending U.S. patent application, entitled "Method and System for Digital Certificate Generation and Distribution", Ser. No. 09/095,230 assigned to the assignee of the present invention, incorporated herein by reference in its entirety. Other certificate forming methods, may be used if desired without departing from the spirit and scope of the present invention.

The signed object 74 further includes signature 82 generated in accordance with the signature generation logic presented above. A SignedObjectHandshakeMessage constructor suitably packages the certificate and incoming sequence number as a Vector which becomes the object to be signed. The client A signs the message using zero as the outgoing sequence number 83 and sends the message across the channel via socket 44 (FIG. 3).

The communication receiver, server B, receives the initial message and uses it to construct its ObjectSigningContext 84. The certificate of client A is suitably verified as either being one in a store on server B or being signed by a certificate server B knows about, as is well understood by those skilled in the art. A strict attribute (shown in object context 48, FIG. 5) of the object context 84, where true means that the certificate must be in the store already, provides capable control of the verification.

If the signature is verified, server B builds its own signed object to complete the handshake, e.g., a SignedObjectHandshakeMessage object 86, using its certificate 88 and another randomly chosen sequence number 90, represented as 'm'. Server B also completes the initialization of its local ObjectSigningContext 84 with the partner certificate provided by client A (A's cert) and the outgoing sequence number (n+1). The signed object 86 formed includes server B's signature 94, outgoing sequence number 92, and an object comprising its sequence number 'm' 90 and certificate 88.

Once client A receives the signed object handshake message 86 from server B, client A completes its initialization of object context; 80, verifies server B's certificate 88 based on the strict attribute, and verifies the signed object handshake message 86 received. Once the initial handshake and verification are complete, signed object message exchange continues by incrementing sequence numbers, building signatures, and verifying each signed object message as it is received. If at any point during the communication the negotiation fails by either party, the socket connection is dropped., Although the present invention has been described in accordance with the embodiments shown, one of ordinary skill in the art will readily recognize that there could be variations to the embodiments and those variations would be within the spirit and scope of the present invention. For example, although the computer systems are described as having separate registration/discovery and object ports, a communication scheme could be developed that would allow a single port to be used. Accordingly, many modifications may be made by one of ordinary skill in the art without departing from the spirit and scope of the appended claims.

What is claimed is:

1. A method for authenticated communication of messages among computer systems in an insecure network, the method comprising:

building a first signed object message in a first computer system, the first signed object message including a first chosen sequence number and a first outgoing sequence number, a first object, and a first signature;

sending the first signed object message to a second computer system;

verifying the first signed object message in the second computer system;

building a second signed object message in the second computer system for replying to the first computer system when the first signed object message is verified, the second signed object message including a second chosen sequence number and a second outgoing sequence number, a second object, and a second signature.

2. The method of claim 1 wherein building the first signed object further comprises providing the first outgoing sequence number and a certificate for the first computer system in the first object.

3. The method of claim 2 wherein the first signature comprises a distinguished encoder rule sequence.

4. The method of claim 1 wherein building the second signed object further comprises providing the second outgoing sequence number as the first chosen sequence number incremented.

5. The method of claim 2 wherein building the second signed object further comprises providing the second outgoing sequence number and a certificate for the second computer system in the second object.

6. The method of claim 5 wherein the second signature comprises a distinguished encoder rule sequence.

7. An authenticated system of communication across an insecure network of computer systems, the system comprising:

a first computer system acting as a sender, the sender sending a first signed object to initiate communication, the first signed object including a first chosen sequence number and a first outgoing sequence number, a first object, and a first signature; and a second computer system acting as a recipient, the recipient receiving the first signed object, verifying the first signed object, and when verified, sending a second signed object in reply, the second signed object including a second chosen sequence number and a second outgoing sequence number, a second object, and a second signature.

8. The system of claim 7 wherein the first object comprises the first outgoing sequence number and a sender certificate.

9. The system of claim 8 wherein the first signature comprises a distinguished encoder rules sequence.

10. The system of claim 7 wherein the second outgoing sequence number comprises the first chosen sequence number incremented.

11. The system of claim 8 wherein the second object comprises the second outgoing sequence number and a recipient certificate.

12. The system of claim 11 wherein the second signature comprises a distinguished rule sequence.

13. A method for achieving authenticated communication over an insecure network of computer systems, the method comprising:

providing a signed object socket;

building signed object messages for authenticated channel communication via the signed object socket; and performing verification techniques on the signed object messages upon receipt of each signed object message within a computer system to ensure and maintain authenticated channel communication, wherein a first signed object message includes a first outgoing sequence number and a first chosen sequence number and a second signed object message includes a second outgoing sequence number and second chosen sequence number.

14. The method of claim 13 wherein performing verification techniques initiates with a handshake exchange of signed object messages.

15. The method of claim 13 further comprising terminating communication when a failure occurs during the verification.

* * * * *